(12) United States Patent
Chang et al.

(10) Patent No.: US 8,911,113 B2
(45) Date of Patent: Dec. 16, 2014

(54) LASER POINTER

(75) Inventors: Yang-Hui Chang, Hsinchu County (TW); Shen-Tai Liaw, Hsinchu (TW); Nae-Jye Hwang, Hsinchu (TW)

(73) Assignee: Intergrated Digital Technologies, Inc., Hsinchu (TW)

( * ) Notice: Subject to any disclaimer, the term of this patent is extended or adjusted under 35 U.S.C. 154(b) by 373 days.

(21) Appl. No.: 13/095,832

(22) Filed: Apr. 27, 2011

(65) Prior Publication Data

US 2012/0275133 A1 Nov. 1, 2012

(51) Int. Cl.
*G02B 27/20* (2006.01)
*B43K 29/10* (2006.01)
*G06F 3/038* (2013.01)
*G06F 3/0354* (2013.01)
*G02B 27/28* (2006.01)

(52) U.S. Cl.
CPC .............. *G06F 3/0386* (2013.01); *G02B 27/20* (2013.01); *G06F 3/03545* (2013.01); *G02B 27/286* (2013.01)
USPC ........... 362/259; 362/553; 362/118; 362/109; 362/205

(58) Field of Classification Search
CPC ............ G06F 3/03542; G06F 3/03545; G06F 3/0383; G06F 3/3086; G02B 27/286
USPC ............. 362/19; 345/179, 180, 182, 183, 156
See application file for complete search history.

(56) References Cited

U.S. PATENT DOCUMENTS

2008/0278445 A1* 11/2008 Sweetser et al. .............. 345/158
2009/0167728 A1* 7/2009 Geaghan et al. .............. 345/179

* cited by examiner

*Primary Examiner* — Anh Mai
*Assistant Examiner* — Zachary J Snyder
(74) *Attorney, Agent, or Firm* — Jianq Chyun IP Office

(57) ABSTRACT

A laser pointer suitable for a touch display panel is provided. The laser pointer includes a main body, a laser diode and a wave plate. The main body has a containing space. The laser diode is disposed in the containing space and has a light emitting end. The wave plate is disposed on the light emitting end, wherein the laser diode is suitable for emitting a laser beam having linear polarization from the light emitting end, and the wave plate is suitable for transforming the laser beam having linear polarization into a laser beam having circular polarization, such that the laser beam is suitable for being an input signal for the touch display panel.

5 Claims, 3 Drawing Sheets

LASER POINTER

BACKGROUND OF THE INVENTION

1. Field of the Invention

The present invention generally relates to a laser pointer. More particularly, the present invention relates to a laser pointer suitable for emitting an input signal for a touch display panel.

2. Description of Related Art

Display panels traditionally serve the role of displaying the information or the output from a system, while other input device or devices provide inputs to the system. Interactive devices, such as a touch panel that can receive a user's input via touching the display panel, combines both output and input functions and allow a user to interact with the display or the system coupled to the display. As an example, devices such as personal digital assistants (PDAs), mobile phones, personal computers (PCs), tablet PCs, etc. have incorporated touch panels for providing users with more input choices.

Conventional touch panels or touch screens have a number of different designs, such as resistive type, surface-wave type, capacitive type, and infrared-ray type designs. All of these designs typically require combining a display device with a separate touch panel sheet. The resistive type, surface-wave type, capacitive type, and infrared-ray type touch panel are operated by users' fingers or stylus. The in-cell type optical touch display panels could be operated by light, and the touch position is located by photo sensors designed in the in-cell type display panel.

The above-mentioned in-cell type optical touch display panel includes a display panel suitable for sensing a light signal emitted by a stylus to be operated. If the laser beam emitted by a laser pointer is able to be applied in the operating of the touch display panel, a user distant from a touch display panel can operate the touch display panel by a laser pointer, such that the operating of a touch display panel is more convenient.

SUMMARY OF THE INVENTION

The present invention is to provide a laser pointer, the laser beam emitting by the laser pointer is suitable for operating a touch display panel.

As embodied and broadly described herein, the present invention provides a laser pointer suitable for a touch display panel. The laser pointer includes a main body, a laser diode and a wave plate. The main body has a containing space. The laser diode is disposed in the containing space and has a light emitting end. The wave plate is disposed on the light emitting end, wherein the laser diode is suitable for emitting a laser beam having linear polarization from the light emitting end, and the wave plate is suitable for transforming the laser beam having linear polarization into a laser beam having circular polarization, such that the laser beam is suitable for being an input signal for the touch display panel.

According to an embodiment of the present invention, the laser pointer further includes a control circuit disposed in the containing space and electrically connected to the laser diode, wherein the control circuit has a switch, when the switch is pressed, the control circuit drives the laser diode to emit the laser beam.

According to an embodiment of the present invention, the laser pointer further includes a battery disposed in the containing space and electrically connected to the control circuit.

According to an embodiment of the present invention, the laser pointer further includes a button disposed on the main body, wherein when the button is pushed down to press the switch, the control circuit drives the laser diode to emit the laser beam.

According to an embodiment of the present invention, the laser pointer further includes a cover disposed on an end of the main body and having an opening, wherein the light emitting end of the laser diode faces the cover, and the laser beam is suitable for passing through the opening to be emitted to the touch panel.

According to an embodiment of the present invention, the laser diode is divided into two parts and the wave plate is disposed between the two parts.

According to an embodiment of the present invention, the wave plate is a quarter-wave plate (QWP) or a half-wave plate (HWP).

As embodied and broadly described herein, the present invention provides a laser pointer suitable for a touch display panel. A wave plate is disposed between the touch display panel and the laser pointer. The laser pointer includes a main body and a laser diode. The main body has a containing space. The laser diode is disposed in the containing space and has a light emitting end, wherein the laser diode is suitable for emitting a laser beam having linear polarization from the light emitting end, and the wave plate is suitable for transforming the laser beam having linear polarization into a laser beam having circular polarization, such that the laser beam is suitable for being an input signal for the touch display panel.

According to an embodiment of the present invention, the laser pointer further includes a control circuit disposed in the containing space and electrically connected to the laser diode, wherein the control circuit has a switch, when the switch is pressed, the control circuit drives the laser diode to emit the laser beam.

According to an embodiment of the present invention, the laser pointer further includes a battery disposed in the containing space and electrically connected to the control circuit.

According to an embodiment of the present invention, the laser pointer further includes a button disposed on the main body, wherein when the button is pushed down to press the switch, the control circuit drives the laser diode to emit the laser beam.

According to an embodiment of the present invention, the laser pointer further includes a cover disposed on an end of the main body and having an opening, wherein the light emitting end of the laser diode faces the cover, and the laser beam is suitable for passing through the opening to be emitted to the touch panel.

In summary, the wave plate is disposed on the light emitting end or disposed between the touch display panel and the laser pointer and is suitable for transforming the laser beam having linear polarization into a laser beam having circular polarization, such that the laser beam emitted by the laser diode is suitable for being an input signal for the touch display panel. Thus, a user distant from the touch display panel can operate the touch display panel by the laser pointer so that the operating of the touch display panel is more convenient.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
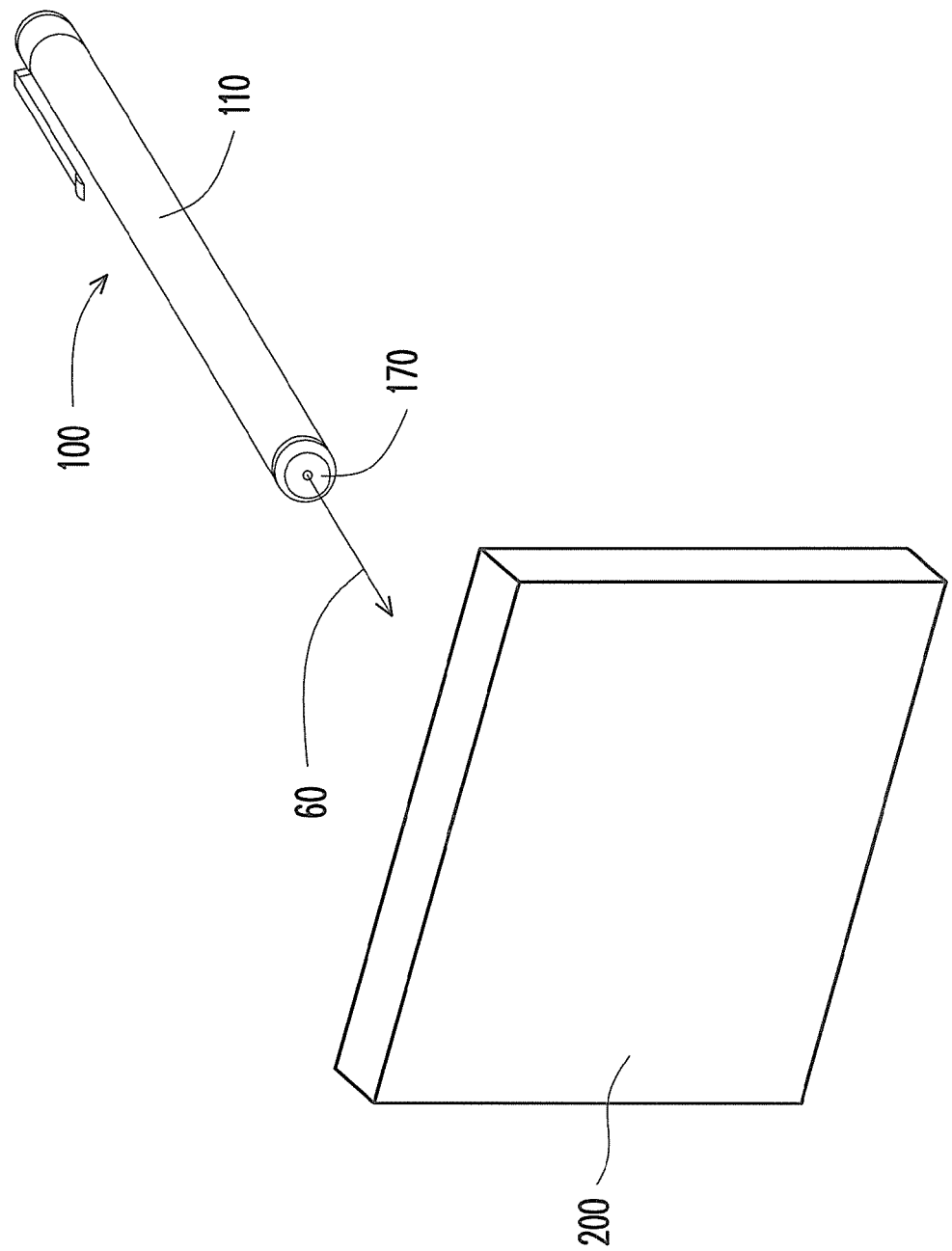
FIG. 1 illustrates a laser pointer according to an embodiment of the present application.
Figure 2:
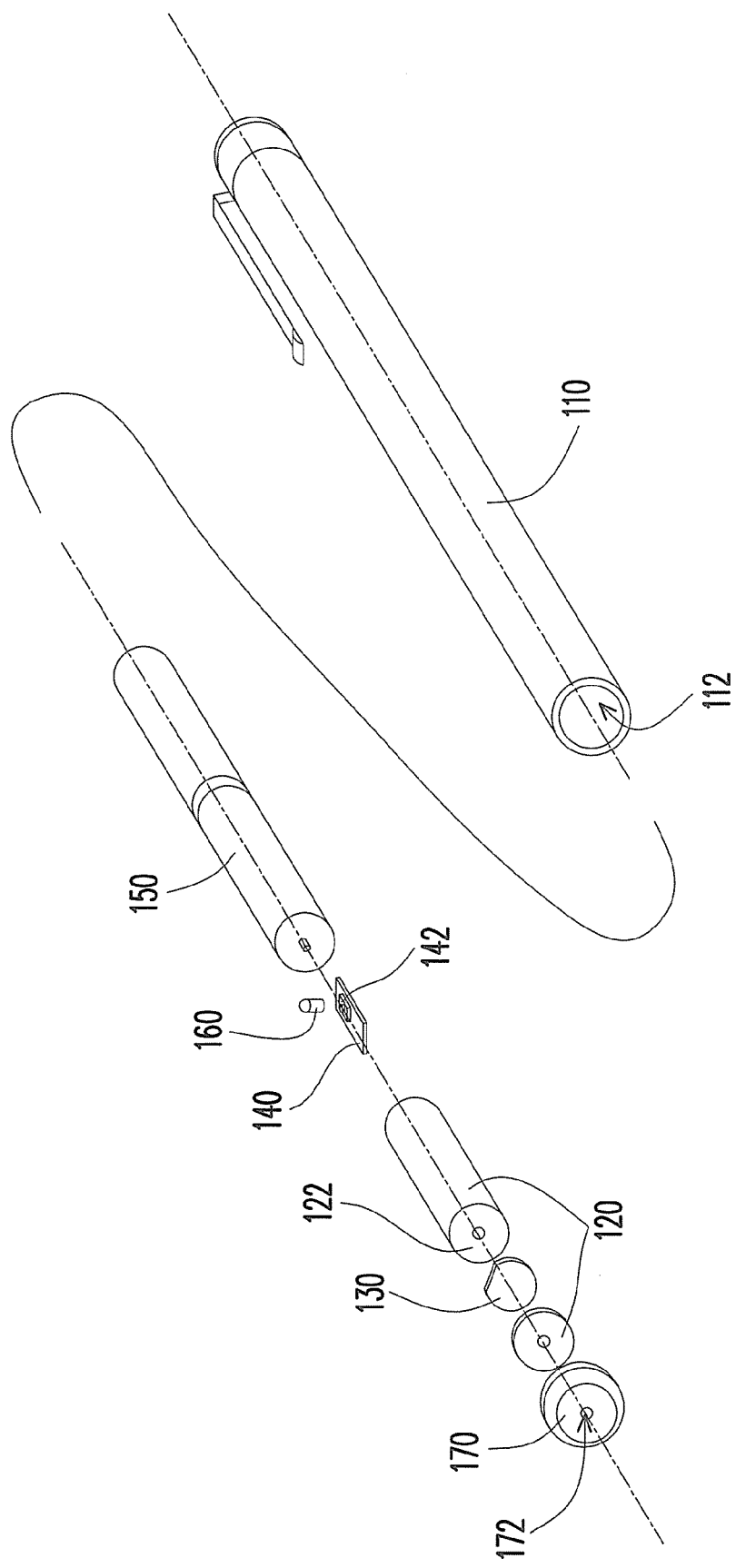
FIG. 2 is an exploded view of the laser pointer of FIG. 1.

FIG. 1 illustrates a laser pointer according to an embodiment of the present application. FIG. 2 is an exploded view of the laser pointer of FIG. 1. Referring to FIG. 1 and FIG. 2, the laser pointer 100 suitable for a touch display panel 200 includes a main body 110, a laser diode 120 and a wave plate 130. The main body 110 has a containing space 112. The laser diode 120 is disposed in the containing space 112 and has a light emitting end 122. The wave plate 130 is disposed on the light emitting end 122. The touch display panel 200 is, for example, an in-cell type optical touch display panel. In this embodiment, the wave plate 130 is for example a quarter-wave plate (QWP). In other embodiments, the wave plate 130 can be half-wave plate (HWP) or any suitable type of wave plate.

Figure 3:
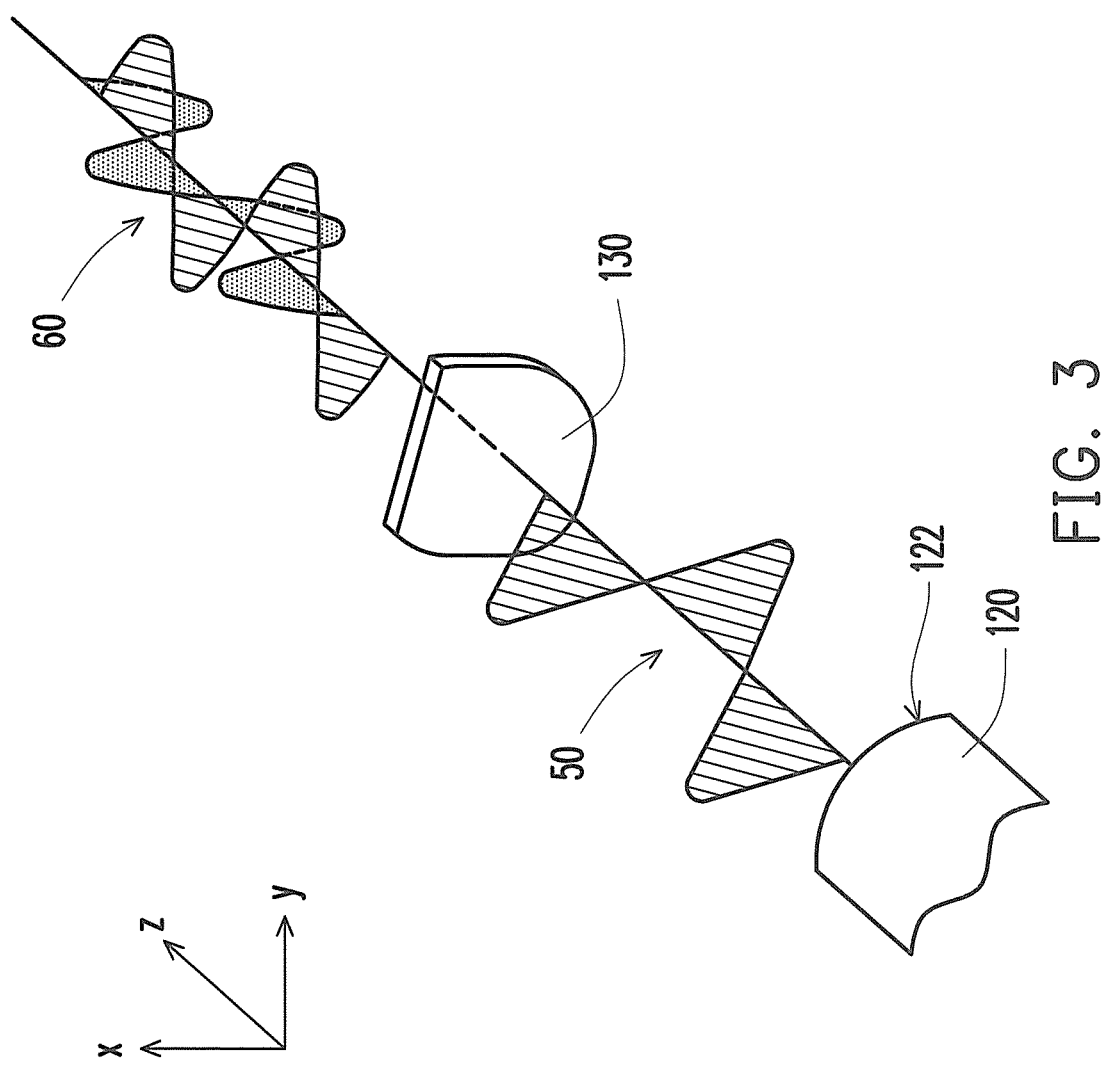
FIG. 3 is a schematic view showing the laser beam emitted by the laser diode of FIG. 2.

FIG. 3 is a schematic view showing the laser beam emitted by the laser diode of FIG. 2. Referring to FIG. 3, the laser diode 120 is suitable for emitting a laser beam 50 having linear polarization from the light emitting end 122 along z direction, and the wave plate 130 is suitable for transforming the laser beam 50 having linear polarization into a laser beam 60 having circular polarization, such that the laser beam 60 is suitable for being an input signal for the touch display panel 200 (shown in FIG. 1). Thus, a user distant from the touch display panel 200 can operate the touch display panel 200 by the laser pointer 100 so that the operating of the touch display panel 200 is more convenient. In other embodiments, the wave plate 130 can be disposed at a position located out of the main body 110 and between the main body 110 and the touch display panel 200.

It should be noted that the laser diode 120 in FIG. 3 is apart from the wave plate 130 for clearly showing the laser beam 50. Actually, the laser diode 120 is leaned against the wave plate 130 while assembled in the main body 110. Besides, the laser diode 120 shown in FIG. 2 is divided into two parts and the wave plate 130 is disposed between the two parts so that the wave plate 130 is fixed firmly. FIG. 3 only shows one part of the laser diode 120 for clearly showing the laser beam 60.

Referring to FIG. 2, particularly, the laser pointer 100 further includes a control circuit 140, batteries 150 (showing two) and a button 160. The control circuit 140 is disposed in the containing space 122 and electrically connected to the laser diode 120, and the control circuit 140 has a switch 142. When the switch 142 is pressed, the control circuit 140 drives the laser diode 120 to emit the laser beam 50 (shown in FIG. 3). The batteries 150 are disposed in the containing space 122 and electrically connected to the control circuit 140 for providing electric power to the control circuit 140 and the laser diode 120. The button 160 is disposed on the main body 110 and aligned to the switch 142, wherein when the button 160 is pushed down to press the switch 142, the control circuit 140 drives the laser diode 120 to emit the laser beam 50.

Referring to FIG. 1 and FIG. 3, in addition, the laser pointer 100 further includes a cover 170. The cover 170 is disposed on an end of the main body 110 and has an opening 172, the light emitting end 122 of the laser diode 122 faces the cover 170, and the laser beam 60 is suitable for passing through the opening 172 to be emitted to the touch panel 100.

In the present embodiment, the wave plate is disposed on the light emitting end or disposed between the touch display panel and the laser pointer and is suitable for transforming the laser beam having linear polarization into a laser beam having circular polarization, such that the laser beam emitted by the laser diode is suitable for being an input signal for the touch display panel. Thus, a user distant from the touch display panel can operate the touch display panel by the laser pointer so that the operating of the touch display panel is more convenient.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A laser pointer, suitable for a touch display panel, the laser pointer comprising:
    a main body having a containing space;
    a cover disposed on an end of the main body and having an opening;
    a laser diode disposed in the containing space and having a light emitting end, wherein the light emitting end of the laser diode faces the cover; and
    a wave plate disposed on the light emitting end, wherein the laser diode is suitable for emitting a laser beam having linear polarization from the light emitting end, the laser beam is suitable for passing through the opening to be emitted to the touch display panel, and the wave plate is suitable for transforming the laser beam having linear polarization into a laser beam having circular polarization without moving the opening, such that the laser beam is suitable for being an input signal for the touch display panel,
    wherein the laser diode is divided into two parts and leaned against the wave plate, and the wave plate is disposed between the two parts so that the wave plate is fixed firmly.

2. The laser pointer as claimed in claim 1, further comprising:
    a control circuit disposed in the containing space and electrically connected to the laser diode, wherein the control circuit has a switch, when the switch is pressed, the control circuit drives the laser diode to emit the laser beam.

3. The laser pointer as claimed in claim 2, further comprising:
    a battery disposed in the containing space and electrically connected to the control circuit.

4. The laser pointer as claimed in claim 2, further comprising:
    a button disposed on the main body, wherein when the button is pushed down to press the switch, the control circuit drives the laser diode to emit the laser beam.

5. The laser pointer as claimed in claim 1, wherein the wave plate is a quarter-wave plate or a half-wave plate.

* * * * *